D. AMERMAN.
SPRING WHEEL.
APPLICATION FILED SEPT. 3, 1910.

1,037,574.

Patented Sept. 3, 1912.

Witnesses
Phil E. Barnes
T. E. Turpin

Inventor
Dorr Amerman,
By James Whelhy & Co.,
Attorneys

UNITED STATES PATENT OFFICE.

DORR AMERMAN, OF NEAR LONGMONT, COLORADO.

SPRING-WHEEL.

1,037,574.  Specification of Letters Patent.  Patented Sept. 3, 1912.

Application filed September 3, 1910. Serial No. 580,289.

*To all whom it may concern:*

Be it known that I, DORR AMERMAN, a citizen of the United States, residing at near Longmont, in the county of Weld and State of Colorado, have invented new and useful Improvements in Spring-Wheels, of which the following is a specification.

My present invention pertains to spring wheels; and it has for its object to provide a spring wheel comprising two or more spaced bands of resilient material which surround its felly, and spacing blocks beneath and over which the resilient bands bend when under load, the whole arrangement being such that the periphery of the wheel is adapted to flatten where it comes in contact with the surface over which it is traveling in the same manner as a pneumatic tire, this in order to give the wheel a large gripping surface which is particularly important when the wheel is used as a drive-wheel in a motor vehicle.

The invention will be best understood by reference to the following description when taken in connection with the accompanying illustration of one specific embodiment thereof, while its scope will be more particularly pointed out in the appended claim.

Figure 1:
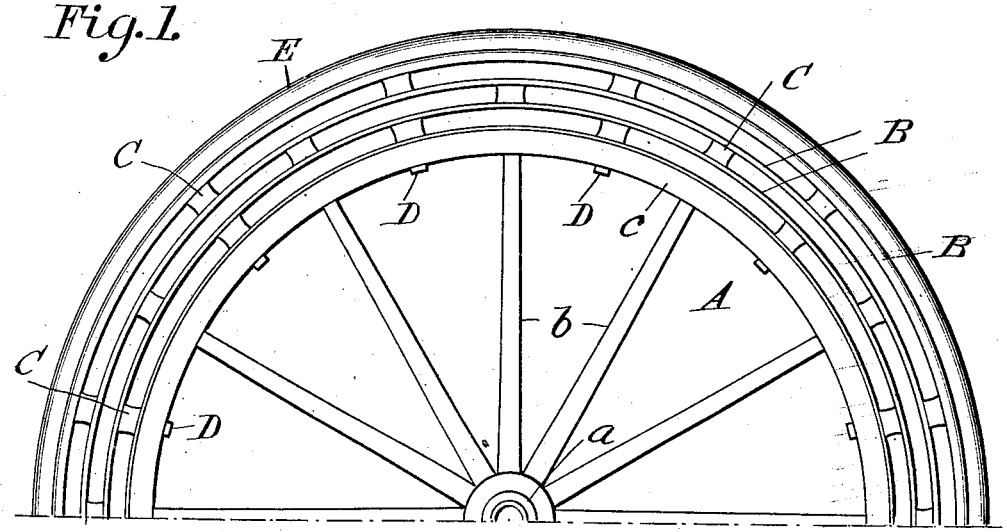
Figure 2:
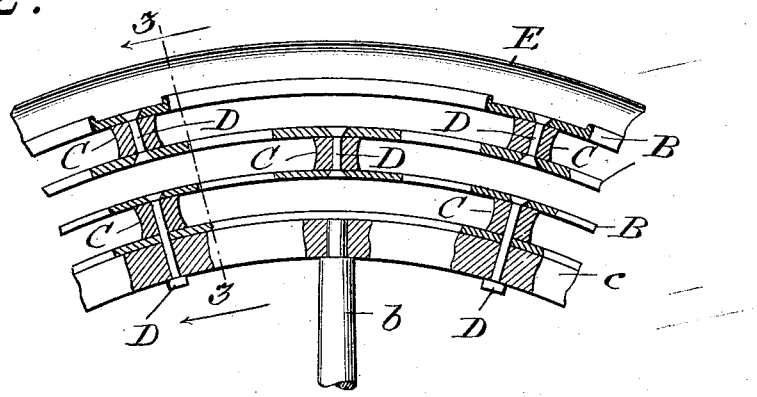
Figure 3:
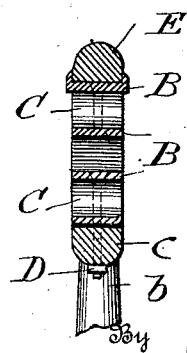

In the drawings: Figure 1 is a side elevation of one-half of a wheel constructed in accordance with my invention, it being understood that the remaining half of the wheel is identical in construction with the portion shown. Fig. 2 is a fragmentary view, partly in side elevation and partly in vertical section, illustrating the manner in which I prefer to connect the interposed spacing blocks. Fig. 3 is a transverse section taken in the plane indicated by the line 3—3 of Fig. 2.

Similar letters designate corresponding parts in all of the views of the drawings, referring to which:

A is a wheel which, so far as its hub $a$, spokes $b$, and felly $c$ are concerned, may be and preferably is of the ordinary well-known construction.

In furtherance of my invention I surround the felly $c$ of the wheel with two or more spaced bands B, of spring steel or other resilient material consonant with the purpose of the bands, and while I show three of the resilient bands, I desire it distinctly understood that without involving departure from the spirit of my invention, two bands or any greater number of bands may be employed according to the purpose to which the wheel is to be put and the strains it will be called upon to bear.

At equidistant points around the felly $c$ of the wheel and between the same and the innermost band B, I arrange supporting blocks C for the band, and I fix the said blocks in position by radially disposed bolts D, which extend through the felly, blocks and band. The said blocks C in common with the other blocks to be hereinafter described, may be formed of rubber or other suitable resilient material, and are so formed when a highly resilient wheel is desired. I would have it understood, however, that I do not limit myself to the making of the said blocks of resilient material, inasmuch as they may be made of compressed paper, fiber, metal or other suitable material, and may be resilient or non-resilient in the discretion of the manufacturer of the wheel. If of metal, the blocks may also be and preferably are welded to the band.

Intermediate the innermost band B and the next outer band B, I arrange supporting blocks C which are fixed to the two bands by radial bolts D, such as shown. If of metal the blocks may also be and preferably are welded to the bands. This second series of blocks C is arranged in such manner that each of the blocks comprised therein is arranged about midway between two of the blocks comprised in the inner series, this in order that the blocks of the inner series will not interfere with flattening or inward giving of the portions of the innermost band that occur between the said blocks, while the blocks of the second series will not interfere with inward giving or bending of the portions of the second band that occur between the said blocks.

Between the second band and the outermost band equidistant blocks C are placed and are secured by radial bolts D, as shown. If of metal the blocks may also be and preferably are welded to the bands. These latter blocks are positioned so that each of them is about midway between two blocks of the second circular series of blocks, this in order to prevent any of the blocks from interfering with the inward bending of the portions of the outermost band that occur between the blocks in the outermost circular series. In other words the blocks of the second circular series and the outermost circular series are arranged about midway of the resilient portions of the innermost and second bands, which obviously contributes to the resiliency and at the same time increases the strength and durability of the wheel as a whole. I provide the outermost band with a tread E, of rubber or other suitable resilient material, and this tread may be secured on the band in the conventional or any other approved manner.

It will be gathered from the foregoing that my novel wheel is simple and inexpensive, and is well adapted to withstand the usage to which vehicle wheels are ordinarily subjected, since it does not embody any moving or sliding joints. It will also be gathered that the wheel is practically noiseless and is not liable to creep or move sidewise, and it will further be appreciated that the flattening capacity of the band portions that occur between the supporting blocks enables the wheel to securely take hold of or grip the ground which is an important advantage when the wheel is used as a traction wheel.

It will further be gathered from the foregoing that my improvement constitutes a cushioning annulus which can be applied to either a new wheel or an old wheel of ordinary construction in such manner as to surround the wheel with a view of preventing the transmission of shock and jar to the wheel and through the wheel to the vehicle of which the wheel forms a part.

While I have shown and described one form of my invention, it is to be understood that I am not limited to the details or the form or relative arrangement of parts disclosed, but that modifications may be made therein without departing from the spirit of the invention as claimed.

Having described my invention, what I claim and desire to secure by Letters-Patent, is:

The herein described wheel, comprising a hub, a felly, spokes interposed between the hub and the felly and connected thereto, a resilient metallic band, of larger diameter than the felly, surrounding and spaced from the felly, supporting blocks arranged at intervals between the felly and the band; said blocks at their ends bearing directly against the felly and the band, radially disposed bolts one to each block, extending through the felly, the blocks and the band and having enlargements at their ends; the enlargements in the band being flush with the outer side thereof, a second resilient metal band, of larger diameter than the first-named band, surrounding and spaced from the latter, supporting blocks arranged at intervals between the bands and bearing directly at their ends against the bands, radially disposed bolts one to each block, extending through the bands and the blocks and having enlargements at their ends disposed in and arranged flush with the bands; the blocks of the set between the bands being arranged in radial alinement with the spokes, and the blocks of the set between the felly and the inner band being arranged opposite the middles of the spaces between the blocks of the set between the bands, a channeled band resilient and of metal surrounding and spaced from the second-named band, supporting blocks arranged at intervals between the two outer bands and bearing directly at their ends against said bands, radially disposed bolts one to each block, extending through the outer bands and the blocks and having enlargements at their ends disposed in and arranged flush with said bands; the blocks of the set between the outer bands being disposed in radial alinement with the blocks between the felly and inner band, and a tread of resilient material carried in the channel of the outer band.

In testimony whereof I have hereunto set my hand in presence of two subscribing witnesses.

DORR AMERMAN.

Witnesses:
LEVAN L. L. SWENSON.
B. F. OSBORN.